July 20, 1926.
H. S. FOLKER ET AL
1,592,930
FORESTALLING VALVE FOR TRAIN CONTROL DEVICES
Filed Feb. 5, 1925    4 Sheets-Sheet 4
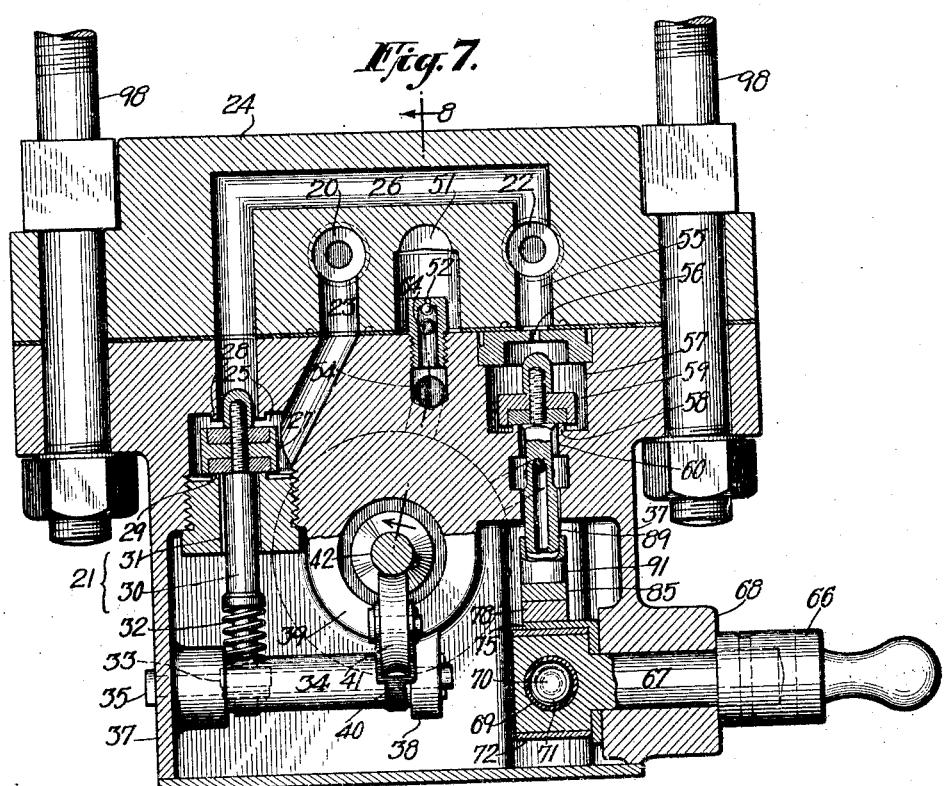
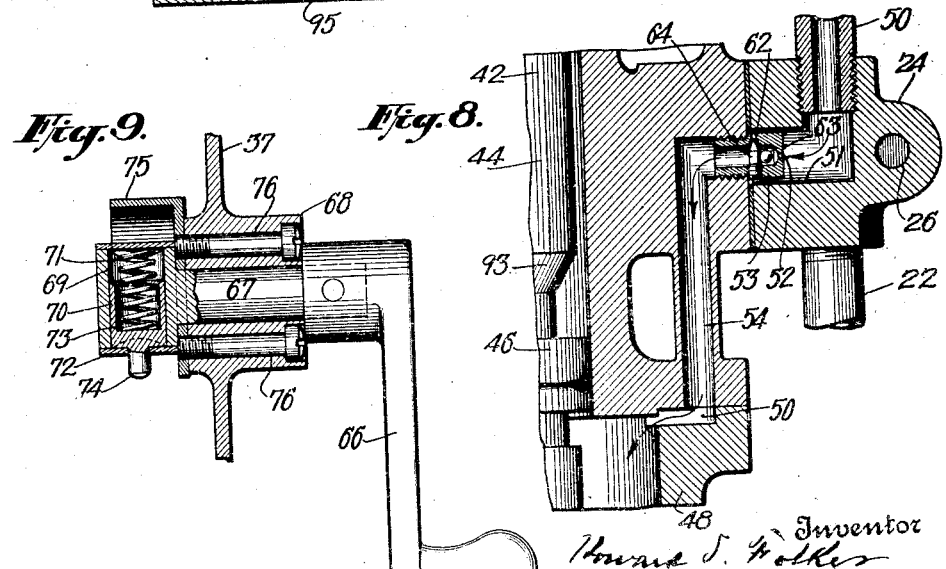

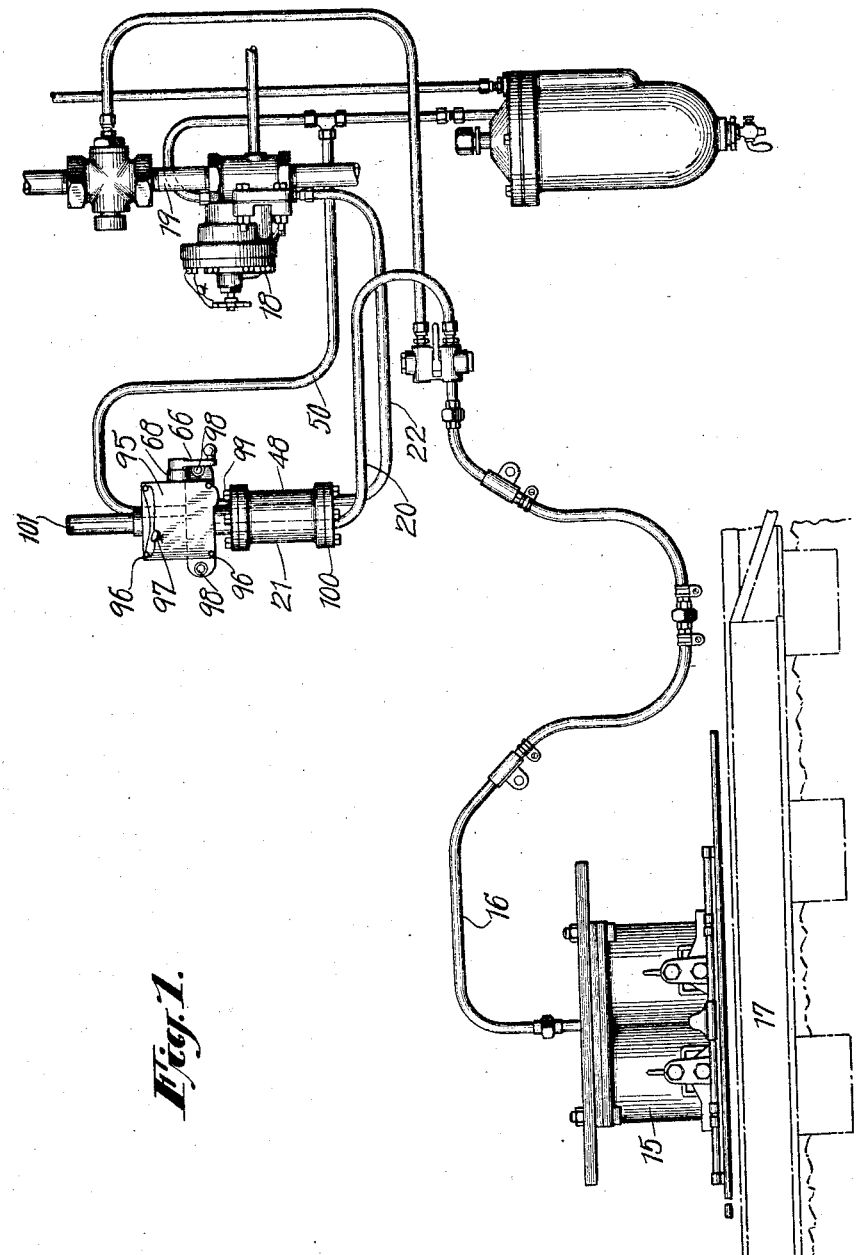

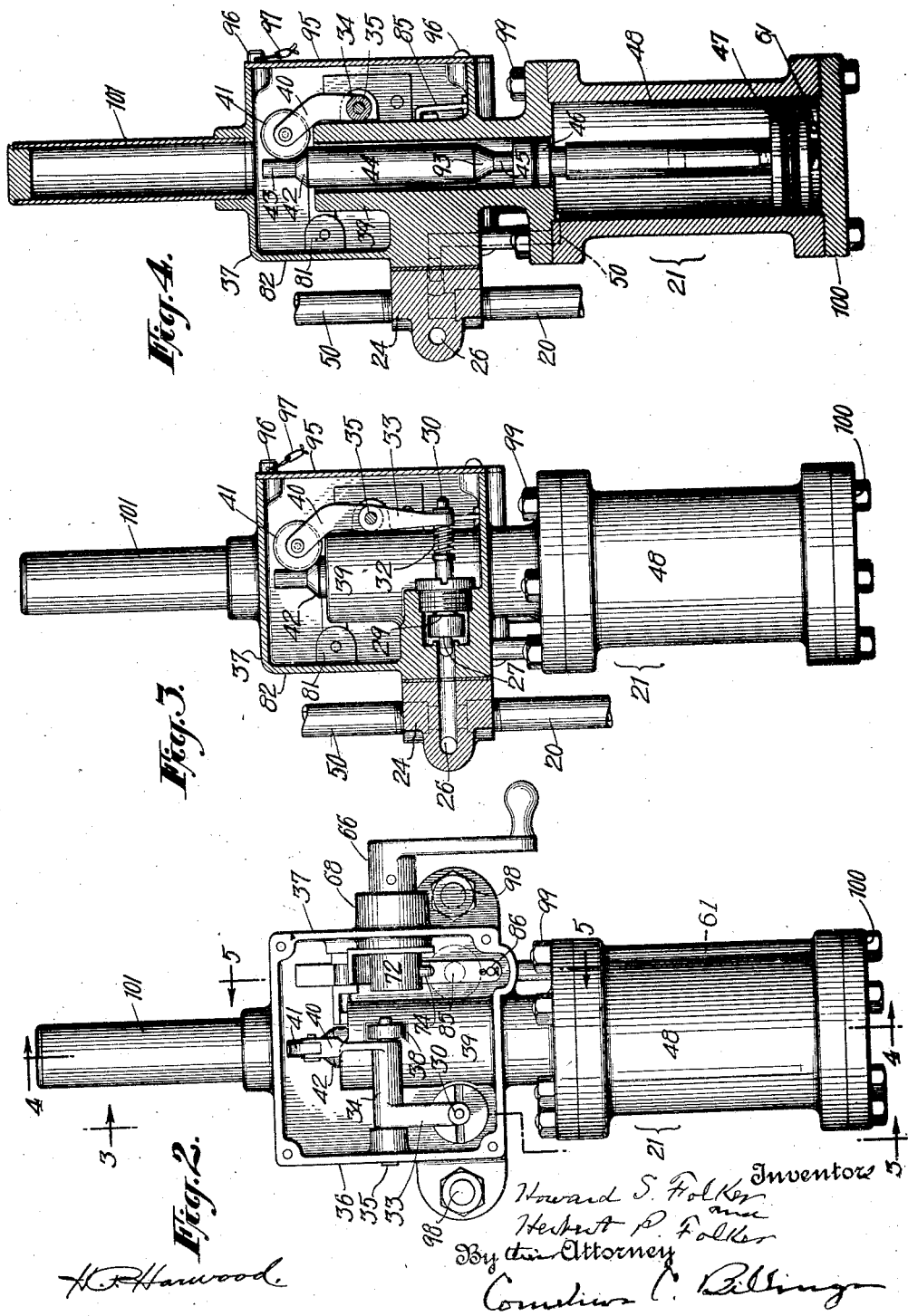

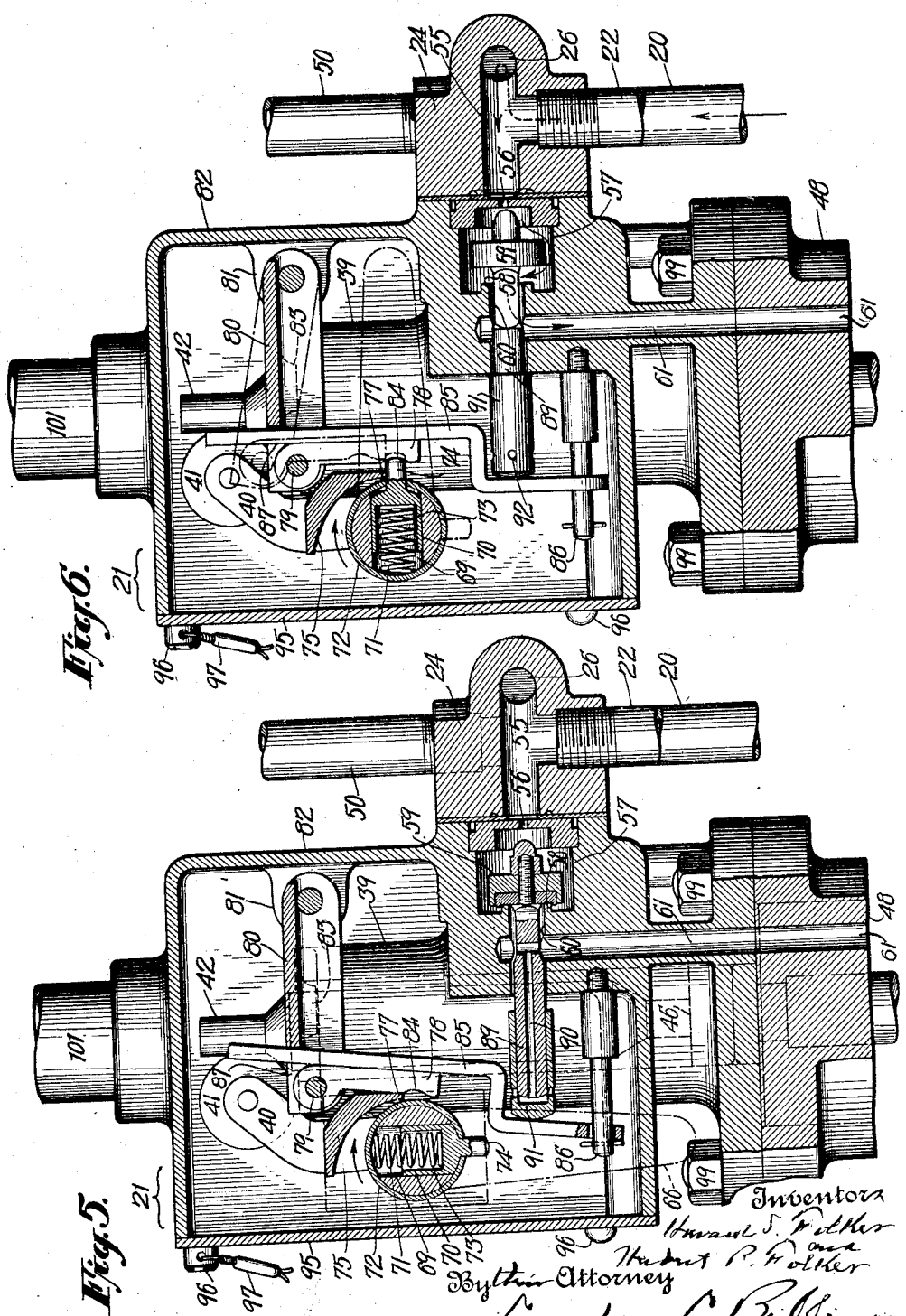

Patented July 20, 1926.

1,592,930

UNITED STATES PATENT OFFICE.

HOWARD S. FOLKER, OF MILL VALLEY, AND HERBERT P. FOLKER, OF SAN FRANCISCO, CALIFORNIA, ASSIGNORS TO THE NATIONAL SAFETY APPLIANCE COMPANY, A CORPORATION OF CALIFORNIA.

FORESTALLING VALVE FOR TRAIN-CONTROL DEVICES.

Application filed February 5, 1925. Serial No. 6,982.

In connection with appliances for the automatic stopping of railroad engines and trains, it is desirable that means may be provided by which the engineman, if alert, and aware of conditions restricting the movement of his train, may prevent an automatic application of the brakes which would otherwise be caused by an actuating impulse from an actuating device when the train is approaching or entering a danger zone. At the same time, it is necessary that, if the engineman is not alert and an automatic application of the brakes is started before he acts to prevent it, the brake application shall continue till the train is stopped; that it shall not be possible for the engineman, by operation of the preventing device, to nullify the effect of a previously received automatic actuation, release the brakes and proceed under possible misunderstanding of conditions by which he should be governed. Further, the preventing device must be so arranged that, if it is permanently held or fastened in operating position, it will not be effective; so that the engineman must be alert to operate the device at or near each actuation point at which restrictive conditions exist. In connection with this requisite, it is desirable that a reasonable time be allowed for proper operation, and that the effectiveness of the preventing device be automatically nullified only after that time has elapsed.

Our present invention provides means for performing three functions, in accordance with the requirements set forth above. First, manual operation which, if performed before an automatic actuation of the brake-setting device has occurred, prevents the actuation of the brake-setting device.

Second, when a predetermined time has elapsed, restoration of the condition under which an automatic actuation of the brake-setting device may occur.

Third, when an automatic actuation occurs before a manual operation, prevention of the effectiveness of a subsequent manual operation.

With these and other objects in view, the invention comprises the apparatus described in the following specification and claims.

The various features of the invention are illustrated in the accompanying drawings, in which:

Fig. 1 is a somewhat diagrammatic view of an automatic train control and stop apparatus and a forestalling device embodying a preferred form of our invention, Fig. 2 is a front elevation of a forestalling valve embodying the preferred form of the invention, a front cover plate being removed to show the mechanism in the interior of the device, Fig. 3 is a vertical sectional view of the device taken on line 3—3 of Fig. 2, Fig. 4 is a vertical sectional view of the device taken on line 4—4 of Fig. 2, Fig. 5 is a vertical sectional view of a portion of the valve device taken on line 5—5 of Fig. 2, showing the forestalling device in an unset position, permitting the operation of the automatic stop mechanism, Fig. 6 is a view similar to that of Fig. 5 showing the position of the parts when the valve device is set to prevent the operation of the automatic stop mechanism, and showing in broken lines the position of the parts when the period during which the forestalling device is set to prevent the operation of the stop mechanism is at an end.

Fig. 7 is a horizontal sectional view of the device,

Fig. 8 is a vertical sectional view of a portion of the device taken on line 8—8 of Fig. 7, and, Fig. 9 is a detail sectional view of a portion of the device taken axially of the operating crank.

In the embodiment of the invention herein described, the forestalling device is illustrated as applied to an automatic train control system operated by variations or differences in fluid pressures and, in forestalling the operation of the automatic apparatus, the forestalling device interrupts or stops the communication and transmission of pressure changes or impulses in this fluid through which the brake setting apparatus is actuated. Certain operating parts of the forestalling device are operated by fluid pressure controlled by the automatic stop mechanism so that, after this fluid pressure has fallen or been released by the automatic stop mechanism, the operation of the forestalling device is prevented by the lack of sufficient pressure to actuate these parts. Upon the manual setting of the forestalling device, a valve of the device is closed by fluid pressure and is held closed for a period of time controlled by the slow escape of fluid pressure, the period of escape of which controls the time during which the forestalling valve device is in action. When the period of escape of this fluid is ended, the valve controlling the action of the stop mechanism returns to its original position and returns the automatic stop apparatus to operative position. With each operation of the forestalling valve device, a latch is released which, if the actuating handle by which the device is set on operating position is held in its actuating position, prevents the return of the forestalling valve mechanism to its forestalling postion until the actuating handle has been rotated through another actuating cycyle, and thus prevents the forestalling valve device from being set permanently in a forestalling position.

Referring more particularly to the accompanying drawings, the forestalling device is illustrated, by way of example, as applied to a standard automatic control apparatus described in Patents 1,439,081 and 1,439,082 granted December 19th, 1922, to H. S. Folker. This apparatus comprises a pressure release apparatus 15 which is actuated, preferably through magnetic action, to release the pressure in a pipe 16 when the apparatus passes over a train controlling device, such as the track magnets 17, when set at "danger", and, through suitable connections transmits this pressure drop, to operate a brake control valve 18 in the main air brake pipe 19. In the present invention the pipe 16 is not connected directly to the control valve 18 but is connected thereto through a pipe 20, a forestalling valve device 21, and a connecting pipe 22 leading from the forestalling device to the control valve, and the forestalling device is so arranged that, upon a manual operation of an actuating mechanism, communication is closed for a period of time between the pressure release apparatus 15 and the control valve 18 and the transmission of an actuating impulse from the apparatus 15 to the valve 18 is thus prevented.

For this purpose, the pipe 20 leading from the automatic pressure release apparatus is connected through a passageway 23, in a supporting plate 24 of the forestalling apparatus, to a valve chamber 25, which communicates through a passageway 26 with the pipe 22 leading to the control valve 18 (Fig. 7). Communication between the passageways 23 and 26 is controlled by means of a valve 27 in the valve chamber 25 adapted to seat on a valve seat 28 and thus close communication between the passages and thus prevent the transmission of a drop in pressure in the pipe 20 to the control valve 18 and thereby prevent the operation of the control valve by a temporary drop in pressure in the pipe 20. In some types of apparatus where the impulses are not transmitted by pneumatic means the valve 27 may be replaced by a suitable electro or other equivalent means adapted to the installation on which the forestalling device is used.

The valve 27 is normally held away from the valve seat 28 by the air pressure in the valve chamber and against a valve seat 29 on the opposite side of the valve chamber, thus holding open communication between the automatic control device 15 and the control valve 18 so that, upon the actuation of the control device 15 the control valve 18 is operated. The valve 27 may however be moved and held against the valve seat 28 by a valve rod 30 projecting forwardly through an opening 31 centrally of the valve seat 29 and actuated through a spring 32 from a lever arm 33. The lever arm 33 is formed integrally on a rock sleeve 34 pivoted on a shaft 35, one end of which is supported in a side wall 36 of the valve casing 37 and the other end of which is supported in an ear 38 on a central wall or tube 39 within the casing. Rocking motion to operate the valve 37 is transmitted to the sleeve 34 and arm 33 through an upright lever arm 40 rigidly mounted on the sleeve and having at its upper end a cam roller 41 adapted to ride on the surface of a cam rod 42 slidable vertically in the tube 39 and having a reduced portion 43 at its upper end against which the roller 41 bears when the valve is in its normally open position. The cam rod 42 is also provided with a lower, enlarged portion 44 which, when the rod slides upwardly, pushes the roller 41 outwardly and rocks the sleeve 34 and actuating lever arm 33 to close the valve 27.

The position and movement of the cam rod 42 are controlled by a downwardly extending stem 45 on which are mounted a smaller piston 46 fitting, and slidable in, the tube 39 and a larger piston 47 slidably fitting a cylinder 48 of larger diameter beneath and opening into the lower end of the tube 39. The pistons are normally held in their lowermost positions by means of air under pressure admitted from the main air pipe through a pipe 50 leading therefrom to a passageway or channel 51 in the supporting plate 24 from which the air is admitted through a check valve orifice 52, past an inwardly opening ball check valve 53 to a channel or passageway 54 leading to the upper end of the cylinder 48 above the piston 47. As the area of the larger piston 47 is greater than that of the smaller piston 46, the pistons are forced to and held in their lowermost positions and the cam rod 42 is in its lowermost position with the cam roller 41 resting against the reduced portion 43.

When air under pressure equal to, or very nearly equal to, that admitted to the upper part of the cylinder 48 is admitted to the lower end portion of the cylinder beneath the piston 47, the pistons, piston rod or stem 45, and cam rod 42 are forced upwardly, inasmuch as the combined area beneath the pistons 47 and 46 is greater than the area on the upper face of the piston 47, and the enlarged portion 44 of the cam rod pushes the roller 41 outwardly, rocking the sleeve 34 and arm 33 and closing the valve 27 against the seat 28 to close communication between the automatic control device 15 and the control valve 18. In order that the pistons may not be operated and the control device 15 shut from communication with the control valve 18 after the control device 15 has been actuated, the air for admission beneath the piston 47 is taken from the pipe system 16 and 20 in which the pressure is nearly equal to that in the brake pipe system under ordinary conditions but which immediately drops to too low a pressure to lift the pistons as soon as the automatic device 15 is actuated to release the pressure. This air is conducted from the passageway 26 through a short branch passage 55 and through an orifice 56 into a valve chamber 57 having an outlet opening through a valve seat 58 which is normally closed by a valve 59. When the valve 59 is moved from the seat 58 through the manual operation of an actuating means, the air flows from the chamber 57 through the valve seat opening into a short, horizontal passageway 60 and a vertical passageway 61 which communicates at its lower end with the cylinder 48 below the level of the piston 47 and thus admits air under sufficient pressure to lift the pistons 46 and 47, the stem 45 and cam rod 42 immediately closing the valve 27 and thus placing the automatic stop device 15 out of communication with the control valve 18. The valve 27 remains closed as long as the enlarged surface of the cam rod remains in contact with the cam roller 41, which in turn is controlled by the length of time during which the cam rod is being raised and remains in its upper positions.

The period of time during which the pistons 46 and 47 and the cam rod are being lifted is governed by the rate of escape of air from the upper portion of the cylinder 48 above the lower, larger piston 47, which is compressed by the rising of the piston and would, if not permitted to escape, build up a pressure sufficient to bring about an equilibrium of forces on the pistons and prevent further movement. The air can not escape from the upper portion of the cylinder 48 to the main air pipe through the ball check valve 53 as this closes under back pressure, but is permitted to escape through a needle valve opening 62 in the casing 63 of the ball check valve, the passage through the needle valve opening 62 being controlled by means of a needle valve 64. As soon, therefore, as the pressure above the lower piston 43 builds up to a pressure greater than that in the train pipe and reservoir, the air thus compressed passes back through the opening 62 into the train pipe reservoir. The rate of passage of the air through the opening 62 may be controlled by means of the valve 64 and in that manner, the period of time during which the cam rod 42 is rising and the valve 27 is held closed may be controlled.

The valve 59 is lifted from its seat 58 by a manually actuated means and then held open until the cam rod 42 reaches its upper limit of travel, whereupon the piston 46 automatically actuates means to seat the valve 59 on the seat 58 and to vent the passageway 61 and lower portion of the cylinder 48 to the atmosphere and permit the pistons 46 and 47 and the cam rod 42 to fall to their lowermost positions. The manually acting means is so devised that it can not hold the valve 59 permanently open but can merely give the valve an opening movement after which it has no further control over the valve and the valve is then automatically closed as soon as the cam rod 42 reaches its uppermost, valve releasing, position. The valve can be opened again only by a repeated operation of the manual operating means and then only for similar limited period of time.

The manually actuated valve operating means is actuated from a crank 66 rigidly mounted on the outer end of a shaft 67 which is journaled in a bearing 68 in a side wall of the casing or housing 37 and extends into the interior of the housing. At its inner end, the shaft 67 is enlarged and provided with a transverse passage 69 in which is slidably mounted a plunger 70. The plunger 70 is pressed outwardly by means of a spring 71 confined between an encircling collar 72 about the enlarged end of the shaft and a recess 73 in the inner end of the plunger. The outer end of the plunger 70 is provided with a stem 74 projecting through an opening in the collar 72 but which may be pressed inwardly flush with the outer surface of the collar against the action of the spring 71. As the shaft 69 is rotated in the direction of the arrow in Figs. 5 and 6, the stem 74 bears against the curved under surface of a cam member 75 secured to the side wall of the casing 37 by means of screws 76 and is pressed inwardly against the tension of the spring 71 until the end of the stem clears the lower edge 77 of the cam surface 75 and is released. As the stem is released, it is plunged outwardly by the spring 71 and serves to open the valve 59 through suitable transmitting elements.

The outward thrust of the stem 74, as it is released from the lower edge 77 of the cam member 75, is received directly on a latch 78 depending from, and pivotally mounted at 79 on, a lever arm 80 pivotally supported at its rear end on an ear 81 on the rear wall 82 of the casing 37 and having a portion 83 of its arm projecting over and resting on the upper edge of the tube 39. The front face of the latch 78 near its lower end is preferably notched at 84, where the end of the stem 74 strikes it, to serve to arrest the movement of the shaft 67. As the latch 78 is driven rearwardly by the impulse of the stem 74, it imparts a rearward thrust to a vertical offset lever 85, the lower end of which is slidably supported on, a pin 86 projecting forwardly from the lower portion of the valve casing, and the upper end of which extends through and is retained by the pivot 79 in a notch 87 in the lever arm 80. As the lever 85 slides rearwardly on the pin 86 it pushes rearwardly a stem 89 projecting forwardly from the valve 59, thus driving the valve from its seat 58 and permitting air under pressure to pass to the lower end of the cylinder 48 and thus set in motion the mechanism to close the valve 27. The valve 59 is held in open position through the action of the spring 71 and actuating elements until the piston 46 reaches the upper end of the tube 39.

As the upper face of the piston 46 reaches the upper end of the tube 39 it contacts with the lower face of the portion 83 of the lever 80 and upon its continued upper movement lifts the lever 80 about the pivot 81, thereby lifting the latch 78 until its lower end clears the end of the plunger stem 74, the position of the elements being then as shown in broken lines in Fig. 6. The removal of the latch 78 in this manner provides a space between the end of the plunger stem 74 and the lever 85 in which the lever is free to move and the lever 85 is accordingly driven forwardly by pressure transmitted from the valve 59 through the stem 89, the space between the lever and stem 74 being sufficient to permit the lever 85 to move to its foremost position without being stopped by the stem 74. The valve 59 thus seats on its seat 58, closing the passageway 60 to the under side of the piston 47.

At the same time that the valve 59 seats on its seat 58 an escape passage is opened from the vertical passageway 61 through a longitudinal passage 90 in the stem 89 leading to the forward end of the valve stem and thus venting the lower portion of the cylinder 48 to the atmosphere in the casing 37. When the off-set lever 85 is again driven rearwardly against the stem 89 to again lift the valve 59 from its seat 58, the passageway 90 is closed by means of a cap 91 which covers the outer end of the stem 89 and thus serves as a closing valve. When the off-set lever 85 is permitted to move forwardly the cap 91 is sufficiently loose on the stem 89 to permit the escape of air into the cap from whence it escapes through openings 92 in the side wall of the cap.

As the air escapes from the lower side of the piston 47 the pistons and the cam rod 42 rapidly sink to their lowermost positions and the various elements return to their original positions. The apparatus can not, however, act to lift the valve 59 from its seat 58 and permit air to enter beneath the piston 47 until the crank 66 is given another revolution. When the latch 78 is lifted and the stem 74 is released from the notch 84, the crank normally falls by gravity to the position indicated in Fig. 5 and the latch falls with the fall of the pistons. However, if the handle be locked or fastened in the position shown in Fig. 6 in full lines, the lower end of the latch rests on the stem 74 in the position indicated in broken lines in Fig. 6 and, as the plunger stem 74 does not reach to the off-set lever 85, it does not prevent the valve 59 and stem 89 from reaching their forward positions in which the valve seats on its seat 58. To again actuate the valve mechanism, therefore, the crank 66 must be rotated sufficiently to permit the latch 78 to sink to operative position and must then be further rotated to again release the plunger stem 74. The lower end of the enlarged portion 44 of the cam rod 42 may be formed in a conical reduced portion 93 which permits the cam roller 41 to move inwardly. This causes a momentary opening of the valve 27 which is however immediately closed when the cam rod drops and has no influence on the operation of the device.

In case it is desired to forestall the operation of control valve as, for instance in case the engineman finds that he has operated the forestalling device too soon and that the track magnet will not be passed during the period that the forestalling device is in operation, this period can be lengthened by giving the crank 66 another rotation and return to the position shown in full lines in Fig. 6. In this rotation, the pistons first fall to their lowermost positions and then begin their slow upward movement which then lasts for the full period of the cam movement. While the period of forestalling may thus be lengthened, it requires constant attention to accomplish this lengthening and as soon as the manual control is removed from the device the automatic stop mechanism is again in operative communication with the control valve.

The stem or rod 30 of the valve 27 and valve stem 89 of the valve 59 are preferably not packed as this permits freer actuation and lower maintainance and does not, therefore, interfere with the operation of the apparatus. The escape of air about the rod 30 when the valve 27 is closed on the seat 28 contributes to a reduction in pressure in the pipes 16 and 20 and thus contributes to a prompt closing of the control valve after a forestalled actuation.

The casing 37 is preferably made in the form of a box having an open front face through which access may be readily obtained to the moving elements and which is closed, when in operative condition by means of a cover plate 95 secured to the casing by means of screws 96, some of which may be sealed by means of a wire and seal 97 to prevent unauthorized tampering with the mechanism. The tube 39 and the various passages, and supports are cast in the casing and the casing is mounted on its supporting plate 24 by means of bolts 98, which may also serve to hold the apparatus on a suitable support. The cylinder 48 is secured to the casing 37 by bolts 99 or other suitable means and is closed by means of a bottom plate 100, which may be removed to permit the removal of the pistons 47, 46 and cam rod 42. The casing is also provided with a closed tube 101 projecting from its top into which the cam rod may slide in its upper movement.

The operation of the device is, briefly, as follows: Upon turning the crank 66 and shaft 67 in the direction of the arrow in Figs. 5 and 6, the outer end of the projecting stem 74 of the plunger comes into contact with the inner, curved face of the fixed cam surface 75 and is pressed inwardly compressing the spring 71. As the plunger stem 74 passes below and clears the lower edge 77 of the cam 75, it is released and the spring 71 forces it outwardly against the latch 78 driving the latch rearwardly. The rearward movement of the latch is transmitted through the off-set lever 85 to the valve stem 89, driving the stem 89 rearwardly and moving the valve 59 from its seat 58 and placing the valve chamber 57 in communication with the passageways 60 and 61 leading to the lower end of the cylinder 48. If the crank 66 is turned after the automatic device 15 has operated and has released the pressure in the pipes 16 and 20 and in the passageways 26 and 55 and valve chamber 57 the pressure of the air transmitted to the lower end of the cylinder 48 through the passageways 60 and 61 is too low to lift the pistons 46 and 47 and cam rod 42, and the forestalling device can not be operated.

If, however, the crank 66 is turned before the device 15 has operated to release the pressure in the pipes 16 and 20 and their connected passageways, the pressure of the air thus admitted to the cylinder 48 beneath the piston 47 lifts this piston and the cam rod 42, the air in the cylinder 48 above the piston 47 escaping to the main air reservoir through the passageway 54, needle valve opening 62, passageway 51 and pipe 50.

As the cam rod 42 rises, the enlarged surface 44 pushes the cam roller 41 outwardly, rocking the arm 40, rock sleeve 34 and arm 33 and transmitting a thrust from the lower end of the arm 33 through the spring 32 to the valve stem 30 to press the valve 27 onto the seat 28 and thus close communication between the passageway 23 connected through pipes 16 and 20 to the automatic control device 15 and passageway 26 connected through pipe 22 to the control valve 18. If the automatic device 15 is then operated while the valve 27 is seated on the seat 28, the lowering of pressure in the pipes 16 and 20 is not transmitted to the control valve 18 and the train is not stopped.

As the smaller piston 46 rises above the upper end of the tube 39 it lifts the lever arm 80 and the latch 78 depending therefrom until the lower end of the latch rises above and clears the end of the plunger stem 74 and permits the valve 59, stem 89 and offset lever 85 to move forwardly, the valve 59 thereby being unseated from its seat 58. The air in the cylinder 48 beneath the piston 47 is thus released to the atmosphere through the passageway 61, passageway 90 in the stem 89, cap 91 and openings 92, permitting the pistons to fall, and returning the forestalling device to inactive position, air being rapidly admitted to the upper part of the cylinder 48 through the ball check valve 53 to force the pistons downwardly. If the crank 66 is permitted to fall to its original position as shown in Fig. 5, the latch 78 is permitted to fall to position to be again pushed rearwardly upon another rotation of the crank. If, however, the crank be held or fastened in the position indicated in dotted lines in Fig. 6, the projecting plunger stem 74 holds or supports the lower end of the latch and prevents it from falling to operative position. The device can not, therefore, be operated unless the crank 66 be given another revolution.

Through the above invention, the forestalling of the operation of the automatic stop mechanism can only be accomplished if the automatic stop mechanism has not been set in operation and only by constant attention on the part of the engineman which insures constant alertness. While the device has been described in connection with a pneumatic system actuated directly by induced magnetic influences, it is usable with other types of operating mechanism and with other actuating means.

As changes of construction could be made within the scope of our invention, it is intended that all the matter contained in the above description or shown in the accompanying drawings be interpreted as illustrative and not in a limiting sense.

Having thus described our invention, what we claim as new and desire to secure by Letters Patent is:

1. A controlling device, a controlled device, and an intercepting device for modifying the communication between said controlling device and said controlled device, which comprises, mechanism for preventing actuation of the controlled device by the controlling device, and control means actuated by the operation of the controlling device to prevent actuation of the preventing mechanism and rendered inactive by the actuation of the preventing mechanism, whereby actuation of the controlling means prior to that of the preventing mechanism renders the preventing mechanism inoperative.

2. A controlling device, a controlled device, and an intercepting device for modifying the communication between said controlling device and said controlled device, which comprises, mechanism operative only during a limited period of time for preventing actuation of the controlled device by the controlling device, and control means actuated by the operation of the controlling device to prevent actuation of the preventing mechanism and rendered inactive by the actuation of the preventing mechanism, whereby actuation of the controlling means prior to that of the preventing mechanism renders the preventing mechanism inoperative.

3. An automatic air brake control apparatus including an automatic train stop, a controlling device therefor adapted to be actuated when the train approaches or enters a danger zone, and a forestalling device operative to prevent automatic actuation of the train stop, said forestalling device being operated by means directly under control of said controlling device when the forestalling device is in normal condition so that actuation of the controlling device prior to actuation of the forestalling device renders the forestalling device inoperative during continuance of actuated condition of the controlling device.

4. An automatic air brake control apparatus including an automatic train stop, a controlling device therefor adapted to be actuated when the train approaches or enters a danger zone, and a forestalling device operative during a predetermined time interval to prevent automatic actuation of the train stop, said forestalling device being operated by means directly under control of said controlling device when the forestalling device is in normal condition so that actuation of the controlling device prior to actuation of the forestalling device renders the forestalling device inoperative during continuance of actuated condition of the controlling device.

5. An automatic air brake control apparatus including an automatic train stop, a controlling device therefor adapted to be actuated when the train approaches or enters a danger zone, a forestalling device including a valve controlling communication between the train stop and the controlling device, a manually controlled member for moving said valve to close such communication, said member being operated by means directly under control of said controlling device when the member is in normal condition so that actuation of the controlling device prior to actuation of the member renders the member inoperative during continuance of actuated condition of the controlling device, and means for automatically opening said valve after the lapse of a predetermined time interval.

6. Apparatus of the type described which comprises, an automatic stop device, a brake valve, means to break communication between said automatic device and said brake valve, a cam movable to actuate said communication breaking means, manually controlled means actuated from said automatic stop device system when said device is inactive for moving said cam, and means to return said cam after a definite time interval.

7. Apparatus of the type described which comprises, an automatic stop device, a brake valve, manually controlled means actuated from said automatic stop device system when said device is inactive to break communication between said automatic device and said brake valve, and means to return said communication breaking means to inactive position after a definite time interval.

8. Apparatus of the type described which comprises, an automatic stop device, a brake valve, a cam, means actuated from said cam to break communication between said automatic stop device and said brake valve, a differential piston actuated by pressure from said brake system to hold said cam in inactive position, means for admitting air from said automatic stop device to said piston to move said cam to actuating position, manually actuated means for operating said air admitting means, and venting the admitted air upon the lapse of a definite time interval.

9. Apparatus of the type described which comprises, an automatic stop device, a brake valve, means to break communication between said automatic stop device and said brake valve, a piston movable to actuate said communication breaking means, means normally holding said piston in inactive position, means for admitting air controlled by said automatic stop device to said piston to actuate said cam, means manually movable to a position to actuate said air admitting means, and means to close said air admitting means and vent the air thus admitted upon the lapse of a definite time interval.

10. A controlling device, a controlled device and an intercepting device for modifying the communication between said controlling device and said controlled device, including means governing said communication and operable to prevent actuation of the controlled device by the controlling device, an operating member adapted to actuate said governing means, said operating member being under control of said controlling device so that actuation of the controlling device prior to actuation of the member renders the member inoperative during continuance of actuated condition of the controlling device, actuating means for said operating member, and means for nullifying the effect of said actuating means at the end of a predetermined time interval, so that said member and said governing means are returned to normal condition and so remain until said actuating means is again operated.

11. A controlling device, a controlled device, and an intercepting device for modifying the communication between said controlling device and said controlled device, including a member adapted to modify said communication so as to prevent actuation of the controlled device by the controlling device during a predetermined period of time and to restore said communication to normal condition at the end of said period of time, and operating means for said member under control of said controlling device to render the member inoperative upon actuation of the controlling device prior to actuation of the member and during continuance of actuated condition of the controlling device.

12. A controlling device, a controlled device, and an intercepting device for modifying the communication between said controlling device and said controlled device, including means governing said communication and operable to prevent actuation of the controlled device by the controlling device, a member adapted to actuate said governing means, operating means for said member under control of said controlling device to permit operation of said member when the member is in normal condition and to prevent operation of said member upon actuation of the controlling device prior to actuation of the member and during continuance of actuated condition of the controlling device, actuating means for said time-controlled member, and means actuated by said member for nullifying the effect of said actuating means at the end of the predetermined operating time of said member, whereby said member and said governing means are returned to normal condition and so remain until said actuating means is again operated.

13. A controlling device, a controlled device, and an intercepting device for modifying the communication between said controlling device and said controlled device, including means governing said communication and operable to prevent actuation of the controlled device by the controlling device, a piston adapted to actuate said governing means, means normally holding said piston in inactive position, means for admitting fluid under pressure to move said piston, the pressure of said fluid being directly under control of said controlling device when said piston is in inactive position so that actuation of the controlling device prior to movement of the piston renders the piston inoperative during continuance of actuated condition of the controlling device, and means to close said fluid admitting means and vent the fluid thus admitted upon the lapse of a definite time interval.

14. A controlling device, a controlled device, and an intercepting device for modifying the communication between said controlling device and said controlled device, including means governing said communication and operable to prevent actuation of the controlled device by the controlling device, a differential piston adapted to actuate said governing means, means for supplying fluid under pressure to opposed different areas of said piston to bias the piston to a normal position and for permitting the regulated slow return escape of said fluid when forced back by movement of the piston from normal position, said regulated escape causing said movement to consume a predetermined time, an actuating valve normally venting the opposite larger area of said piston and operable to supply to that area fluid under pressure to cause said movement of the piston, actuating means for said valve, and means actuated by said piston at the limit of its movement for nullifying the effect of said actuating means, thereby causing said piston and said governing means to return to normal condition and so remain until said actuating means is again operated.

15. A time-controlled actuating device comprising, a differential piston, means for supplying fluid under pressure to opposed different areas of said piston to bias the piston to a normal position and for permitting the regulated slow return escape of said fluid when forced back by movement of the piston from normal position, said regulated escape causing said movement to consume a predetermined time, and means operable to supply to the opposite larger area of said piston fluid under pressure to cause said movement of the piston.

16. A controlling device, a controlled device, and an intercepting device for modifying the communication between said controlling device and said controlled device, including means governing said communication and operable to prevent actuation of the controlled device by the controlling device, time-controlled means adapted to actuate said governing means, an actuating device for said time-controlled means, a transversely rotatable, resiliently pressed tumbler, means for withdrawing said tumbler against said resilient pressure and releasing it in a definite position of its rotatory movement, a transmitting latch for transmitting motion from said released tumbler to operate said actuating device, said latch being arranged to be withdrawn from transmitting position by said time-controlled means at the end of the predetermined operating time of said time-controlled means, so that said time-controlled means and said governing means are returned to normal condition and so remain until said tumbler is again rotated and released.

17. A controlling device, a controlled device, and an intercepting device for modifying the communication between said controlling device and said controlled device, including means governing said communication and operable to prevent actuation of the controlled device by the controlling device, operating means adapted to actuate said governing means, an actuating device for said operating means, a transversely rotatable, resiliently pressed tumbler, means for withdrawing said tumbler against said resilient pressure and releasing it in a definite position of its rotatory movement, a transmitting latch for transmitting motion from said released tumbler to operate said actuating device, and means acting after a definite time interval to withdraw said latch from transmitting position, so that said operating means and said governing means are returned to normal condition and so remain until said tumbler is again rotated and released.

18. A controlling device, a controlled device, and an intercepting device for modifying the communication between said controlling device and said controlled device, including means governing said communication and operable to prevent actuation of the controlled device by the controlling device, a differential piston adapted to actuate said governing means, means for supplying fluid under pressure to opposed different areas of said piston to bias the piston to a normal position and for permitting the regulated slow return escape of said fluid when forced back by movement of the piston from normal position, said regulated escape causing said movement to consume a predetermined time, an actuating valve normally venting the opposite larger area of said piston and operable to supply to that area fluid under pressure to cause said movement of the piston, a transversely rotatable, resiliently pressed tumbler, means for withdrawing said tumbler against said resilient pressure and releasing it in a definite position of its rotatory movement, a transmitting latch for transmitting motion from said released tumbler to operate said actuating valve, said latch being arranged to be withdrawn from transmitting position by said piston at the limit of its movement, thereby causing said piston and said governing means to return to normal condition and so remain until said tumbler is again rotated and released.

19. A time-controlled actuating device comprising, a differential piston, means for supplying fluid under pressure to opposed different areas of said piston to bias the piston to a normal position and for permitting the regulated slow return escape of said fluid when forced back by movement of the piston from normal position, said regulated escape causing said movement to consume a predetermined time, an actuating valve normally venting the opposite larger area of said piston and operable to supply to that area fluid under pressure to cause said movement of the piston, a transversely rotatable, resiliently pressed tumbler, means for withdrawing said tumbler against said resilient pressure and releasing it in a definite position of its rotatory movement, a transmitting latch for transmitting motion from said released tumbler to operate said actuating valve, said latch being arranged to be withdrawn from transmitting position by said piston at the limit of its movement, thereby causing said piston to return to normal position and so remain until said tumbler is again rotated and released.

20. Apparatus of the type described which comprises, an automatic stop device, a brake valve, a piston, means actuated by the movement of said piston to break communication between said stop device and said brake valve, means normally holding said piston in inactive position, means for admitting fluid under pressure to move said piston, the pressure of said fluid being directly under control of said stop device when said piston is in inactive position so that actuation of the stop device prior to movement of the piston renders the piston inoperative during continuance of actuated condition of the stop device, and means to close said fluid admitting means and vent the fluid thus admitted upon the lapse of a definite time interval.

21. Apparatus of the type described which comprises, an automatic stop device, a brake valve, means actuated by air controlled by said stop device for breaking communication between said stop device and said brake valve, an actuating valve normally closed and venting air from said communication breaking means, a transversely rotatable resiliently pressed tumbler, means for withdrawing said tumbler against said resilient pressure and releasing it in a definite position of its rotatory movement, means for transmitting motion from said released tumbler to open said actuating valve and hold it in open position, and means acting after a definite time interval to withdraw said transmitting means.

22. Apparatus of the type described which comprises, an automatic stop device, a brake device, means actuated by air controlled by said stop device for breaking communication between said stop device and said brake valve, an actuating valve normally closed and venting air from said communication breaking means, a transversely rotatable, spring pressed, tumbler, means for withdrawing said tumbler against said resilient pressure and releasing it in a definite position of its movement, means for transmitting motion from said released tumbler to open said actuating valve and hold it in open position, means acting upon the movement of said communication breaking means to a limiting position to withdraw said transmitting means, and means to prevent the return of said transmitting means while said tumbler is in its position of release.

23. Apparatus of the type described which comprises, an automatic stop device, a brake valve, a stop valve movable to stop communication between said automatic device and said brake valve, a cam rod, a differential piston, a check valve permitting the flow of air from said brake system to the upper face of said piston and having a constricted by-pass opening, a normally closed actuating valve venting the lower face of said piston when closed and openable to admit air beneath said piston from said automatic stop system, means manually movable to a position to impart a thrust, a transmitting latch for transmitting said thrust to open said actuating valve and maintain it in open position, means actuated by the movement of said piston to its upper limit to withdraw said latch from transmitting position and permit the closing of said actuating valve, said manually actuating means preventing the return of said latch to transmitting position while in actuating position, and means for transmitting motion from said cam rod to said stop valve.

24. Apparatus of the type described which comprises, an automatic stop device, a brake valve, a stop valve movable to stop communication between said automatic device and said brake valve, a cam movable to close said stop valve, manually actuated means for admitting air from said automatic stop device system to actuate said cam, means actuated by said cam to vent said air and return said cam, and means driven by said cam to open said stop valve.

25. Apparatus of the type described which comprises, an automatic stop device, a brake valve, means for breaking communication between said automatic stop device and said brake valve, a piston for actuating said means, a valve for admitting air controlled by said automatic stop device to actuate said piston when open and venting said air when closed, a resiliently pressed tumbler rotatable transversely of its axis, means for pressing said tumbler against said resilient means during a portion of its path of rotation and releasing it in a definite position, a transmitting means for transmitting motion from said released tumbler to said air admission valve, and means actuated by said piston at a limit of movement for withdrawing said transmitting means and preventing its return while said tumbler is in its position of release.

26. Apparatus of the type described which comprises, an automatic stop device, a brake valve, a stop valve movable to stop communication between said automatic device and said brake valve, a differential piston, means for supplying fluid under pressure to the upper part of said piston and to permit the slow return escape of said fluid when forced back by movement of the piston, a normally closed actuating valve venting the lower face of said piston when closed and openable to admit air beneath said piston from said automatic stop system, means manually movable to a position to impart a thrust, a transmitting latch for transmitting said thrust to open said actuating valve and maintain it in open position, means actuated by the movement of said piston to its upper limit to withdraw said latch from transmitting position and permit the closing of said actuating valve, said manually actuating means preventing the return of said latch to transmitting position while in actuating position, and means for transmitting motion from said piston to said stop valve.

27. Apparatus of the type described which comprises, an automatic stop device, a brake control valve, a normally open forestalling valve movable to close communication between said stop device and said brake valve, a cam means movable to close said forestalling valve, a pneumatic means for moving said cam device to valve closing position, means for admitting air controlled by said stop device to said pneumatic means and normally venting said pneumatic means to the atmosphere, manually actuated means movable to a position to hold said air admitting and venting means to air admitting position, means for transmitting said actuation from said manually actuated means to said air admission valve, and means actuated by said cam moving means at a limit of movement for withdrawing said transmission means, said manual actuating means preventing the return of said transmitting means while in actuating position.

28. Apparatus of the type described which comprises, an automatic stop device, a brake control valve, a normally open forestalling valve movable to close communication between said stop device and said brake valve, a cam means movable to close said forestalling valve, pneumatic means for moving said cam device to valve closing position, means for admitting to said pneumatic means air controlled by said stop device when said pneumatic means is inactive to said pneumatic means and normally venting said pneumatic means to the atmosphere, manually actuated means movable to a position to hold said air admitting and venting means to air admitting position, means for transmitting said actuation from said manually actuated means to said air admission means, means actuated by said cam moving means at a limit of movement for withdrawing said transmission means, said manual actuating means preventing the return of said transmitting means while in actuating position, fluid pressure means for controlling the speed of movement of said cam moving means by the escape of fluid, and means for controlling the rate of escape of said fluid.

29. Apparatus of the type described which comprises, a cut-off valve normally in open position, a cam for moving said cut-off valve to closed position, pneumatic means for moving said cam to closing position, manually controlled means for admitting air to said pneumatic means, and means actuated by said cam after a definite time interval for venting said air and permitting said cam to return to normal position.

30. Apparatus of the type described which comprises, a normally open cut-off valve, a cam movable to position to close said cut-off valve, a differential piston for operating said cam, means for admitting air to one side of said piston to move said cam to closing position, and means for venting said air when said cam reaches a limiting position and permitting said cam to return to its normal position.

31. Apparatus of the type described which comprises, a normally open cut-off valve, a cam movable to position to close said cut-off valve, a differential piston for operating said cam, means for admitting air to one side of said piston to move said cam to closing position, means for venting said air when said piston reaches a limiting position, and means for permitting the slow escape of air from and the rapid return of air to the other side of said piston to return said piston to its normal position.

32. Apparatus of the type described which comprises, a normally open cut-off valve, means for closing said cut-off valve, a control valve for said closing means, a transversely rotatable, resiliently pressed tumbler, means for withdrawing said tumbler against said resilient pressure and releasing it in a definite position of its cycle of rotation, means for transmitting motion from said tumbler to said control valve to open said valve and hold it in open position, and means acting after a definite time interval to withdraw said transmitting means.

33. Apparatus of the type described which comprises, a normally open cut-off valve, means for closing said cut-off valve, a control valve for said closing means, a transversely rotatable, resiliently pressed tumbler, means for withdrawing said tumbler against said resilient pressure and releasing it in a definite position of its cycle of rotation, means for transmitting motion from said tumbler to said control valve to hold said valve in open position, means acting after a definite time interval to withdraw said transmitting means, and means to prevent the return of said transmitting means while said tumbler is in released position.

34. Apparatus of the type described which comprises, a normally open cut-off valve, a differential piston, means for supplying fluid under pressure to the upper part of said piston and to permit the slow return escape of said fluid when forced back by movement of the piston, a normally closed actuating valve venting the lower face of said piston when closed and openable to admit air beneath said piston, means manually movable to a position to impart a thrust, a transmitting latch for transmitting said thrust to open said actuating valve and maintain it in open position, means actuated by the movement of said piston to its upper limit to withdraw said latch from transmitting position and permit the closing of said actuating valve, said manually actuating means preventing the return of said latch to transmitting position while in actuating position, and means for transmitting motion from said cam rod to said cut-off valve.

35. Apparatus of the type described which comprises, a normally open cut-off valve, a pneumatically operated cam movable to close said stop valve, manually actuated means for admitting air to operate said cam, means actuated by said cam to vent said air and return said cam, and means driven by said cam to open said cut-off valve.

36. Apparatus of the type described which comprises, a normally open cut-off valve, pneumatically operated means for closing said cut-off valve, manually actuated means movable to a position to set said operating means in operation, transmitting means between said manually actuated means and said cut-off operating means, and means operating at a definite time interval to withdraw said transmitting means and permit said cut-off actuating means to return to inactive position.

37. Apparatus of the type described which comprises, a normally open cut-off valve, pneumatically operated means for closing said cut-off valve, manually actuated means movable to a position to set said operating means in operation, transmitting means between said manually actuated means and said cut-off operating means, means operating at a definite time interval to withdraw said transmitting means and permit said cut-off actuating means to return to inactive position, and means preventing the return of said transmitting means while said manual actuating means is in operating position.

38. An automatic air brake control apparatus including an automatic train stop, a controlling device therefor adapted to be actuated when the train approaches or enters a danger zone, a forestalling device including a valve controlling communication between the train stop and the controlling device, a movable member arranged for actuating said valve and having two parts of different areas, means for supplying fluid under pressure to opposed sides of said parts, means for controlling the escape of fluid from said opposed sides, means for supplying to the other side of that one of said parts having the greater area fluid under pressure under control of said controlling device, means for controlling said last-named supply of fluid under pressure, and means operable by said movable member for nullifying actuation of said last-named means.

39. An automatic air brake control apparatus including an automatic train stop, a controlling device therefor adapted to be actuated when the train approaches or enters a danger zone, a forestalling device including means for modifying communication between the train stop and the controlling device, a movable member arranged for actuating said means and having two parts of different areas, means for supplying fluid under pressure to opposed sides of said parts, means for controlling the escape of fluid from said opposed sides, means for controlling a supply of fluid under pressure to the other side of that one of said parts having the greater area, and means operable by said movable member for nullifying actuation of said last-named means.

40. An automatic air brake control apparatus including an automatic train stop, a controlling device therefor adapted to be actuated when the train approaches or enters a danger zone, a forestalling device including means for modifying communication between the train stop and the controlling device, a movable member arranged for actuating said means and having two parts of different areas, means for supplying fluid under pressure to opposed sides of said parts, means for controlling the escape of fluid from said opposed sides, means for supplying to the other side of that one of said parts having the greater area fluid under pressure under control of said controlling device, means for controlling said last-named supply of fluid under pressure, and means operable by said movable member for nullifying actuation of said last-named means.

41. An automatically controlled manual controlling device including means for modifying the communication between two devices, a movable member arranged for actuating said means and having two parts of different areas, means for supplying fluid under pressure to oppositely acting sides of said parts, means for controlling the escape of fluid from said sides, means for controlling a supply of fluid under pressure to the other side of that one of said parts having the greater area, and means operable by said movable member for nullifying actuation of said last-named means.

42. An automatically controlled manual controlling device including means for modifying the communication between two devices, a movable member arranged for actuating said means and having two parts of different areas, means for supplying fluid under pressure to oppositely acting sides of said parts, means for controlling the escape of fluid from said sides, means for supplying to the other side of that one of said parts having the greater area fluid under pressure under control of one of said two devices, means for controlling said last-named supply of fluid under pressure, and means operable by said movable member for nullifying actuation of said last named means.

HOWARD S. FOLKER.
HERBERT P. FOLKER.